United States Patent Office 3,139,377
Patented June 30, 1964

3,139,377
1,1-DIHALO-BUTADIENE-1,3 NEMATOCIDES
Kenneth W. Ratts, Creve Coeur, Mo., assignor to Monsanto Company, a corporation of Delaware
No Drawing. Filed Feb. 18, 1963, Ser. No. 259,402
5 Claims. (Cl. 167—30)

This invention relates to a method of destroying nematode parasites employing as the essential active ingredient at least one 1,1-dihalo-butadiene-1,3 of the formula

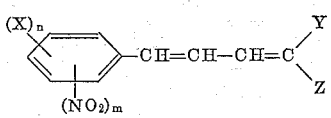

wherein X and Y are like or unlike halogens of atomic weight in the range of 35 to 80 (i.e. chlorine or bromine), wherein Z is halogen of atomic weight in the range of 18 to 80 (i.e. fluorine, chlorine or bromine), wherein $m$ is an integer from 0 to 2, wherein $n$ is an integer from 0 to 3, and wherein the sum of $m$ and $n$ is an integer from 0 to 3.

The 1,1-dihalo-butadiene-1,3 compounds of this invention can be prepared by reacting a triphenylphosphine-dihalomethylene of the formula

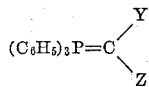

wherein Y and Z have the aforedescribed significance with a cinnamaldehyde or mixtures thereof of the formula

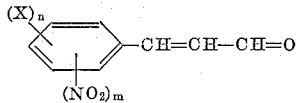

wherein X, $m$ and $n$ has the aforedescribed significance in an inert anhydrous organic liquid medium.

These triphenylphosphine dihalomethylene precursors are prepared by adding a haloform (e.g. chloroform, bromoform, fluorodichloromethane or bromodichloromethane) to a suspension of triphenylphosphine and potassium t-butoxide in an inert anhydrous organic liquid hydrocarbon medium at a temperature of about 0 to 10° C. It is preferred not to separate the resulting triphenylphosphinedihalomethylene (a yellow solid in all instances) because of its reactivity with water but to add the appropriate benzaldehyde or mixtures thereof to the resulting reaction mass or concentrate thereof and thereafter recover the resulting 1,1-dihalo-butadiene-1,3. As illustrative of the preparation of the 1,1-dihalo-butadiene-1,3 nematocides of this invention is the following:

*Example I*

12 parts by weight of chloroform in about 140 parts by weight of heptane is added over a 30 minute period to a well-agitated, ice-cooled mixture of 26.2 parts by weight of triphenylphosphine and 11.2 parts by weight of anhydrous potassium t-butoxide in about 210 parts by weight of heptane. The resulting yellow suspension of trihpenylphosphinedichloromethylene, i.e.

$$(C_6H_5)_3P=CCl_2$$

is then concentrated to about 100 parts by volume by vacuum distilling at about 15–20° C. To this concentrate is added 13.2 parts by weight of cinnamaldehyde in about 150 parts by weight of heptane. The reaction mass is then maintained at 20–25° C. while agitating for about 6 hours. The resulting mixture is filtered and the filter cake is washed twice with heptane (about 70 parts by weight each) and the washings combined with the original filtrate. The combined washings and filtrate are then subjected to vacuum distillation at 20–30° C. to remove the heptane. The residual solid upon recrystallizing from methanol gave 15.4 parts by weight of 1,1-dichloro-4-(phenyl)-butadiene-1,3 which melts at 40–41° C.

*Example II*

Employing the procedure of Example I but replacing cinnamaldehyde with an equimolecular amount of p-nitrocinnamaldehyde there is obtained 1,1-dichloro-4-(4-nitrophenyl)-butadiene-1,3.

*Example III*

Employing the procedure of Example I but replacing chloroform with an equimolecular amount of bromoform there is obtained solid 1,1-dibromo-4-(phenyl)-butadiene-1,3. In this instance the intermediary phosphinedihalomethylene is yellow solid triphenylphosphine-dibromoethylene, i.e $(C_6H_5)_3P=CBr_2$.

*Example IV*

Employing the procedure of Example I but replacing chloroform with an equimolecular amount of bromodichloromethane there is obtained solid 1-chloro-1-bromo-4-(phenyl)-butadiene-1,3. In this instance the intermediary phosphinedihalomethylene is yellow solid triphenylphosphinechlorobromomethylene, i.e.

$$(C_6H_5)_3P=CBrCl$$

*Example V*

Employing the procedure of Example I but replacing cinnamaldehyde with an equimolecular amount of m,p-dichlorocinnamaldehyde there is obtained 1,1-dichloro-4-(3,4-dichlorophenyl)-butadiene-1,3.

In like manner the following 1,1-dihalo-butadiene-1,3 nematocides and mixtures thereof are prepared from the appropriate triphenylphosphinedihalomethylene and the appropriate cinnamaldehyde or mixtures thereof 1-chloro-1-fluoro-4-(phenyl)-butadiene-1,3
1,1-dichloro-4-(3-chlorophenyl)-butadiene-1,3
1,1-dichloro-4-(4-chlorophenyl)-butadiene-1,3
1,1-dichloro-4-(2,4-dichlorophenyl)-butadiene-1,3
1,1-dichloro-4-(2,4,5-trichlorophenyl)-butadiene-1,3
1,1-dichloro-4-(2,4,6-trichlorophenyl)-butadiene-1,3
1,1-dichloro-4-(2-nitrophenyl)-butadiene-1,3
1,1-dichloro-4-(2,4-dinitrophenyl)-butadiene-1,3
1,1-dichloro-4-(2-chloro-4-nitrophenyl)-butadiene-1,3
1,1-dichloro-4-(2-nitro-4-chlorophenyl)-butadiene-1,3
1,1-dichloro-4-(2-bromophenyl)-butadiene-1,3
1,1-dichloro-4-(2,4-dibromophenyl)butadiene-1,3
1,1-dichloro-4-(3,4-dibromophenyl)-butadiene-1,3
1,1-dichloro-4-(2-chloro-4-bromophenyl)-butadiene-1,3
1,1-dichloro-4-(2,6-dichloro-4-bromophenyl)-butadiene-1,3
1,1-dibromo-4-(4-nitrophenyl)-butadiene-1,3
1,1-dibromo-4-(2,4-dinitrophenyl)-butadiene-1,3
1,1-dibromo-4-(4-chlorophenyl)-butadiene-1,3
1,1-dibromo-4-(3,4-dichlorophenyl)-butadiene-1,3
1,1-dibromo-4-(2-chloro-4-nitrophenyl)-butadiene-1,3
1,1-dibromo-4-(2,6-dichloro-4-bromophenyl)-butadiene-1,3
1-chloro-1-bromo-4-(3,4-dichlorophenyl)-butadiene-1,3
1-chloro-1-bromo-4-(4-nitrophenyl)-butadiene-1,3
1-chloro-1-bromo-4-(2,4-dinitrophenyl)-butadiene-1,3
1-chloro-1-bromo-4-(2-chloro-4-nitrophenyl)-butadiene-1,3
1-chloro-1-fluoro-4-(2-nitrophenyl)-butadiene-1,3
1-bromo-1-fluoro-4-(2-nitrophenyl)-butadiene-1,3, and the like.

As aforementioned the 1,1-dihalo-butadiene-1,3 compounds of this invention are effective in destroying nematodes. For example (1) to an aqueous suspension containing 3 p.p.m. of 1,1-dichloro-4-(phenyl)-butadiene-1,3 in a glass vial is added freshly hatched larvae of the vinegar eel worm, *Turbatrix aceti*, and the vial stoppered. After 24 hours at room temperature complete destruction was observed;

(2) to approximately 400 grams of a sandy loam soil infested with the larvae of the tomato root knot nematode, *Meloidogyne javanica*, is added and intimately mixed with 0.150 grams of 1,1-dichloro-4-(phenyl)-butadiene-1,3. This mixture is placed in a one pint Mason jar, the jar capped, and permitted to stand for 7 days at room temperature. The soil is then potted and allowed to aerate for 7 days. Seedling tomato plants (Improved Pearson) are then transplanted in the aerated potted soil. After 4 weeks the plants were removed and examination thereof showed no nematode damage. In contrast the control plants were severly damaged by the nematodes.

The soil-phase of other nematode parasites, such as the sugar beet nematode *Heterodera schachtii*, is also effectively controlled by incorporating in soil infested with same the 1,1-dihalo-butadiene-1,3 compounds of this invention, and a particularly useful class of nematocidal 1,1-dihalo-butadiene-1,3 compounds for this purpose are those of the formula

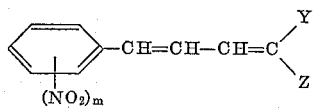

wherein $m$ is an integer from 0 to 2, and wherein Y and Z are halogens of atomic weight in the range of 35 to 80, e.g. 1,1-dibromo-4-(phenyl)-butadiene-1,3; 1,1-dichloro-4-(4-nitrophenyl)-butadiene-1,3, and 1,1-dichloro-4-(2,4-dinitrophenyl)-butadiene-1,3.

In actual usage any of the 1,1-dihalo-butadiene-1,3 compounds of this invention or mixtures thereof are added to the soil in solution, as an emulsion or water dispersion but preferably is added in a solid formulation wherein the active nematocide is distributed over some dry and permanently free-flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of nematode parasites which infest animals. Treating barnyards, chicken pens, stable and other infested areas destroys eggs and infestive larvae of many parasites which infest animals. Moreover, the compositions are effective for the control of nematodes in their environment which includes bodies of animals.

In the use of 1,1-dihalo-butadiene-1,3 compounds of this invention as nematocides or soil fumigants the active compound, diluted or undiluted, may be applied to the soil at rates of 5 to 100 pounds per acre. The preferred application for treating soils of average nematode infestation will be from 10 to 50 pounds per acre. The formulation may contain dispersants which aid uniform distribution.

While this invention has been described with respect to certain embodiments, it is to be understood that it is not so limited and that variations and modifications thereof obvious to those skilled in the art can be made without departing from the spirit and scope thereof.

What is claimed is:

1. The method of destroying nematode parasites which comprises contacting the nematode parasite with a 1,1-dihalo-butadiene-1,3 of the formula

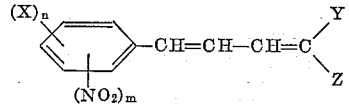

wherein Z is halogen of atomic weight in the range of 18 to 80, wherein Y is halogen of atomic weight in the range of 35 to 80, wherein X is halogen of atomic weight in the range of 35 to 80, wherein $n$ is an integer from 0 to 3, wherein $m$ is an integer from 0 to 2, and wherein the sum of $m$ and $n$ is an integer from 0 to 3.

2. The method of destroying the soil phase of nematode parasites which comprises incorporating in the nematode infested soil a 1,1-dihalo-butadiene-1,3 of the formula

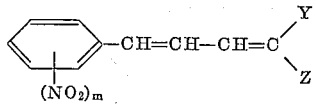

wherein Y and Z are halogens of atomic weight in the range of 35 to 80 and wherein $m$ is an integer from 0 to 2.

3. The method of destroying the soil phase of nematode parasites which comprises incorporating in the nematode infested soil 1,1-dichloro-4-(phenyl)-butadiene-1,3.

4. The method of destroying the soil phase of nematode parasites which comprises incorporating in the nematode infested soil 1,1-dibromo-4-(phenyl)-butadiene-1,3.

5. The method of destroying the soil phase of nematode parasites in an infested agricultural soil which comprises incorporating in the soil at a rate of 5 to 100 pounds per acre a 1,1-dihalo-butadiene-1,3 of the formula

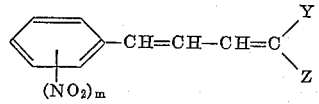

wherein $m$ is an integer from 0 to 2 and wherein Y and Z are halogens of atomic weight in the range of 35 to 80.

References Cited in the file of this patent

UNITED STATES PATENTS

| | | |
|---|---|---|
| 2,312,801 | Craig et al. | Mar. 2, 1942 |
| 2,456,061 | Cass | Mar. 22, 1949 |
| 2,714,619 | Anderegg et al. | Aug. 2, 1955 |
| 2,839,096 | Lane | Apr. 8, 1958 |
| 2,849,503 | Eberly et al. | Aug. 26, 1958 |